United States Patent [19]

Hijikata et al.

[11] 3,902,024

[45] Aug. 26, 1975

[54] ORIGINATING NUMBER CONTROL SYSTEM FOR KEY TELEPHONE SYSTEMS

[75] Inventors: Tokuhisa Hijikata, Ome; Toshiichi Takano, Mitaka, both of Japan

[73] Assignee: Iwatsu Electric Co., Ltd., Tokyo, Japan

[22] Filed: Apr. 13, 1973

[21] Appl. No.: 351,095

[30] Foreign Application Priority Data

Apr. 19, 1972 Japan .................................. 47-39438

Apr. 19, 1972 Japan .................................. 47-39439

[52] U.S. Cl. .................................. 179/99; 179/18 DA

[51] Int. Cl. .................................. H04m 1/00

[58] Field of Search... 179/1 SW, 2 A, 18 B, 18 BE, 179/18 D, 18 DA, 18 E, 27 D, 28, 84 SS, 84 R, 160, 161, 166, 176, 177, 99, 18 AD, 90 D, 27 CA, 6.3 R, 189 R

[56] References Cited

UNITED STATES PATENTS

| | | | |
|---|---|---|---|
| 2,981,801 | 4/1961 | Lomax | 179/18 DA |
| 3,546,391 | 12/1970 | den Hertog | 179/18 D |
| 3,681,536 | 8/1972 | Pask et al. | 179/18 DA |
| 3,691,308 | 9/1972 | Angner et al. | 179/84 SS |
| 3,703,611 | 11/1972 | Riyomiya | 179/99 |

*Primary Examiner*—Kathleen H. Claffy

*Assistant Examiner*—Gerald L. Brigance

*Attorney, Agent, or Firm*—Charles E. Pfund, Esq.

[57] ABSTRACT

In a key telephone system wherein a talking line and a control line are associated with a main control device, and a specific key telephone set and at least one receiving alone key telephone set are connected to the lines, there is provided an originating number control system which comprises an originating number control circuit which is started by means responsive to the operation of the specific key telephone set and maintained in the operated condition by a busy discriminating circuit which is operated while any one of the key telephone set is seizing an office line, polarity transfer means responsive to the operation of the originating number control circuit for reversing the polarity of the office line for the receiving alone key telephone set, and a diode to short circuit the dial signal transmission circuit of the receiving alone key telephone set when the originating number control circuit is inoperative, the receiving alone telephone set being connected such that it can transmit an originating signal only when the means responsive to the operation of the specific telephone set is operated.

9 Claims, 3 Drawing Figures

ORIGINATING NUMBER CONTROL SYSTEM FOR KEY TELEPHONE SYSTEMS

BACKGROUND OF THE INVENTION

This invention relates to an originating number control system of a key telephone system.

As is well known in the art, a key telephone system comprises a main control device including an office line circuit, an internal circuit and a common circuit, and a plurality of key telephone sets connected to the main control device. By the operation of keys or push buttons of respective key telephone sets it is possible to select a desired office line and internal line, and to cause the office line to receive signals transmitted thereto, as well as the supervision, reservation and transfer of the speech. Accordingly, when such a key telephone system is connected directly to the office line, since any one of the key telephone sets can transmit an originating number signal, it is impossible to properly adminster telephone fees, etc.

SUMMARY OF THE INVENTION

Accordingly, it is an object of this invention to provide an improved originating number control system for a key telephone system which can obviate the disadvantage described above.

Briefly stated, in accordance with this invention, when an operator of a specific key telephone set actuates a key or when the handset thereof is picked up, originating number signals from other key telephone sets are able to be transmitted.

According to this invention, for use in a key telephone system wherein a talking line and a control line are associated with a main control device and a specific key telephone set and at least one receiving alone key telephone set are connected to the lines there is provided an originating number control system comprising an originating number control circuit which is started by means responsive to the operation of the specific key telephone set and maintained in the operated condition by a busy discriminating circuit which is operated while any one of the key telephone sets is seizing an office line, a polarity transfer means responsive to the operation of the originating number control circuit for reversing the polarity of the office line for the receiving alone key telephone set, and a diode connected to short circuit the dial signal transmission circuit of the receiving alone key telephone set when the originating number control circuit is inoperative, the receiving alone key telephone set being connected such that it can transmit an originating number signal only when the means responsive to the operation of the specific key telephone set is operated.

According to this invention, for use in key telephone system wherein a talking line and a control line are associated with a main control device, and a specific key telephone set and at least one receiving alone key telephone sets are connected to said lines, an originating number control system comprising an originating number control circuit which is started by a signal received by office line and maintained in the operated condition by a busy discriminating circuit which is operated while any one of said key telephone sets is seizing an office line, switch means controlled by said originating number control circuit for connecting said receiving alone key telephone set to an office line which receives a signal, and means responsive to the operation of said specific key telephone set for enabling said receiving alone key telephone set to transmit an originating number signal.

In a modified embodiment of this invention, the originating number control system comprises an originating number control circuit, switch means controlled by the originating number control circuit, means responsive to the operation of the specific key telephone set for starting the originating number control circuit, and means responsive to the operation of the specific key telephone set for enabling the receiving alone key telephone set to transmit an originating number signal.

BRIEF DESCRIPTION OF THE DRAWINGS

The invention can be more fully understood from the following detailed description taken in connection with the accompanying drawings in which.

DESCRIPTION OF THE PREFERRED EMBODIMENTS

Figure 1:
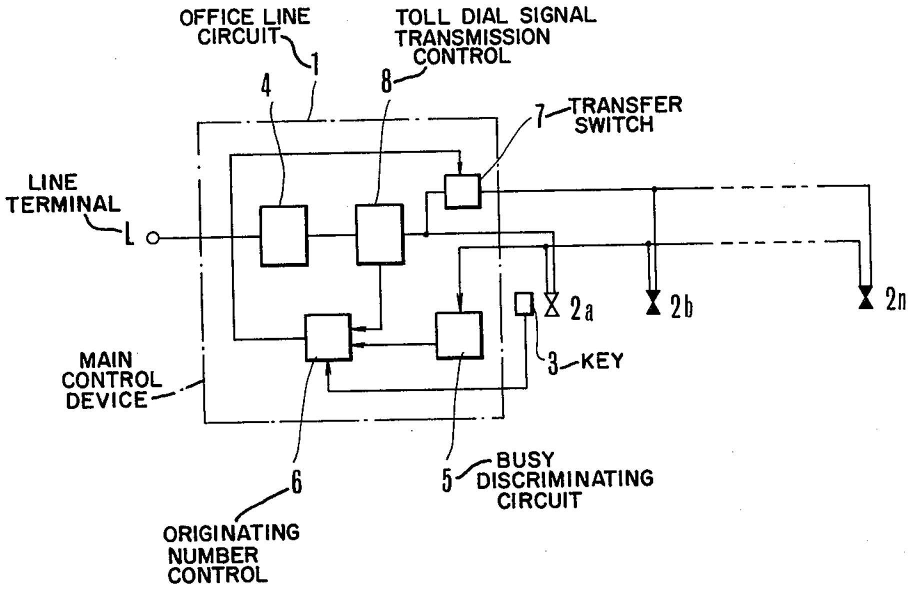
FIG. 1 is a block diagram showing the principle of this invention.

As shown in the block diagram shown in FIG. 1 the control system of this invention comprises a main control device 1, a specific key telephone set 2*a* capable of transmitting and receiving signals and a plurality of key telephone sets 2*b* and 2*n* usually used for reception alone and a key 3 located close to the specific key telephone set 2*a*. The control device 1 includes an office line circuit 4 connected to a line terminal L, a busy condition discriminating circuit 5 for discriminating whether the key telephone set is busy or not, an originating number control circuit 6 which is operated when the operator of the specific key telephone set 2*a* actuates the key 3 for enabling the receiving alone key telephone set to transmit an originating number signal and / or when a signal arrives at the terminal L, a transfer switch 7 controlled by the originating number controll circuit 6, and a toll dial signal transmission control circuit 8 which prevents transmission of toll dial signal when the receiving alone key telephone sets send the toll dial signals.

In the block diagram such as FIG. 1, in assuming that the originating number control circuit 6 would be operated when the operator of the specific key telephone set 2*a* actuates the key 3 for enabling the receiving alone key telephone set to transmit an originating number signal, the present invention will operate as follows.

When a signal arrives at the terminal L, transfer switch 7 is closed so that the receiving alone key telephone sets 2*b* and 2*n* as well as the specific key telephone set 2*a* are connected to the office line whereby all telephone sets can respond to the received signal. When it is desired to transmit originating signals from the receiving alone key telephone sets 2*b* and 2*n*, the operator of the specific key telephone set 2*a* is informed of this fact through an internal line (not shown) whereby the operator of the specific key telephone set 2*a* actuates the key 3 to operate the originating number control circuit 6 thereby reversing the polarity of the line to the receiving alone key telephone sets 2*b* and 2*n* by means of the transfer switch 7. Reversal of the polarity renders non-conductive a diode (not shown) which normally short circuits the signal transmission circuit of the receiving alone key telephone sets 2*b* and 2*n* whereby these telephone sets are enabled to transmit originating signals. The operation of the originating number control circuit 6 is maintained by the busy condition discrimination circuit 5 which operates while the key telephone set is seizing the office line. When the origination number signal is the toll dial signal and it is desired to prevent the transmission of the toll dial signal to the office line, the toll dial signal is detected by the toll dial signal transmission control circuit 8 to release the operation of the originating number control circuit 6 whereby the transfer switch 7 restores the normal polarity for preventing the transmission of the originating number signal from the key telephone sets 2*b* and 2*n*.

Figure 2:
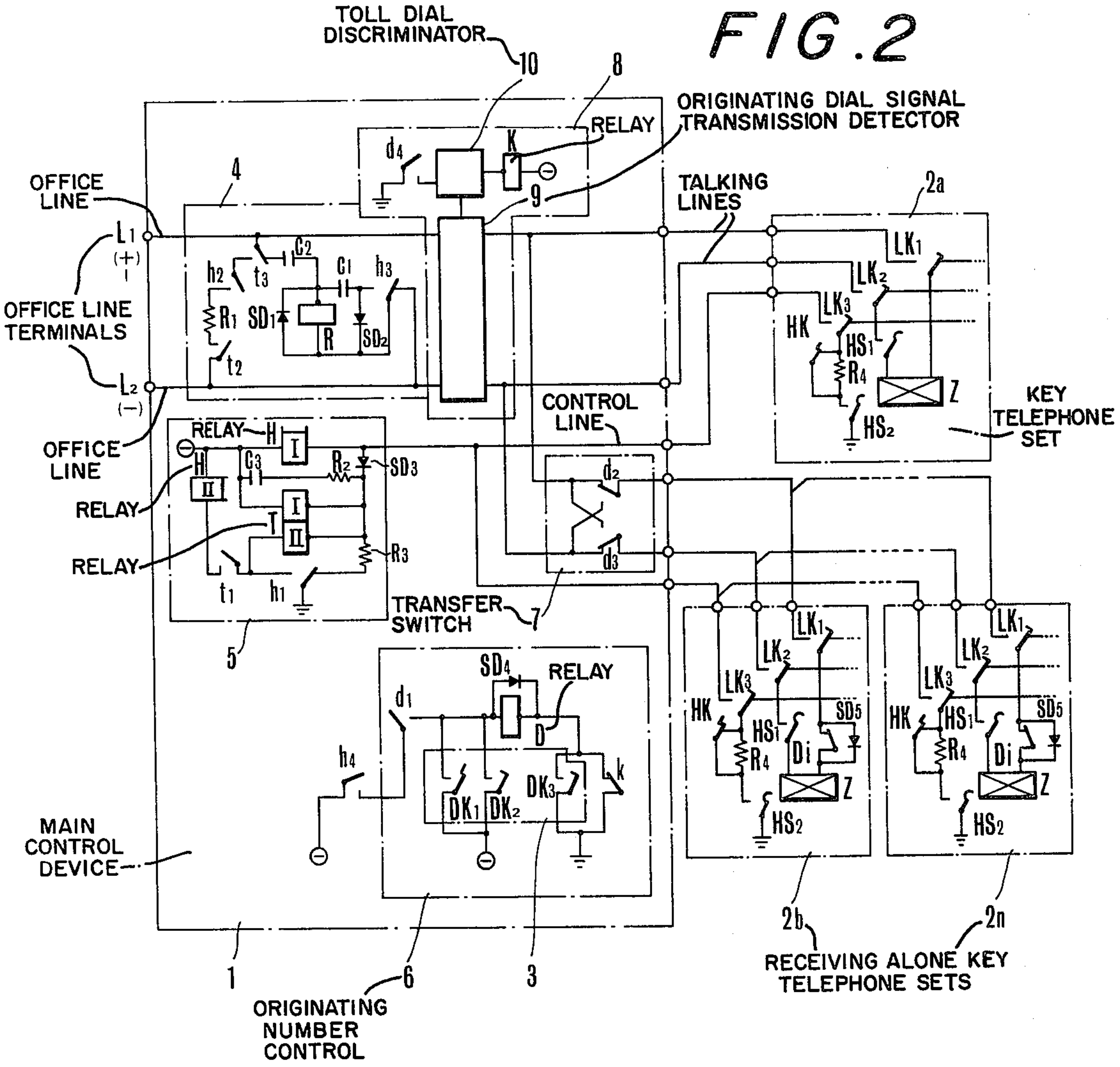
FIG. 2 shows a connection diagram of one embodiment of the invention.

The invention will now be described in more detail with reference to FIG. 2. In FIG. 2, $L_1$ and $L_2$ designate office line terminals, R, H, T, D and K are relays, the latter four having contacts $h_1 - h_4$, $t_1 - t_3$, $d_1 - d_4$ and $k$, respectively. $C_1 - C_3$ designate capacitors, $R_1 - R_4$ resistors, $SD_1 - SD_5$ diodes, $DK_1$ a non-lock type key and $DK_2$ and $DK_3$ lock type keys. $LK_1 - LK_3$ and HK show interlocked keys, $LK_1 - LK_3$ office line seizing keys and HK an office line reserving key. Di represents a dial impulse contact, $HS_1$ and $HS_2$ hook switches, and Z a telephone line circuit (however, the telephone line circuit Z for the receiving alone key telephone sets 2*b* and 2*n* does not include a dial impulse contact). 9 represents an originating dial signal transmission detecting circuit which may be constituted by a relay. 10 represents a toll dial signal transmission discriminating circuit which discriminates whether the signal is for the toll dial signal transmission or not in accordance with the originating dial signal transmission detecting circuit. The discriminating circuit 10 may be constituted by a counter, for example, to count the toll dial prefix which usually is 10 pulses (digit "0"). Reference numerals 1 to 8 inclusive designate the same elements as in FIG. 1. FIG. 2 shows the energized condition of the main control device 1 so that relay T is shown in the energized condition. The control device shown in FIG. 2 operates as follows.

The Case of Receiving an Office Line Signal

When an office line signal is received at terminals $L_1$ and $L_2$, office line circuit 4 is started to cause respective key telephone sets 2*a*, 2*b* and 2*n* to display that the signal has been received and to respond thereto. Since receiving alone key telephone sets 2*b* and 2*n* are also connected to the line through contacts *d*2 and *d*3 they can also respond to the received line signal just like the specific key telephone set 2*a*.

The Case of Originating Signal Transmission

Since diodes $SD_5$ are connected in parallel with the dial impulse contacts Di of respective receiving alone key telephone sets 2*b* and 2*n*, when interlocked keys $LK_1$ to $LK_2$ are operated for enabling these telephone sets to transmit originating signals, if the polarity of the circuit were set such that terminal $L_1$ is positive and terminal $L_2$ is negative, the diodes $SD_5$ would be conductive thus short circuiting the dial impulse contacts Di, respectively. For this reason, it is impossible to transmit the dial impulse. In other words, these telephone sets can not transmit the originating signals.

When it is desired to permit the receiving alone key telephone sets 2*b* and 2*n* to transmit originating signals, the operator of the specific key telephone set 2*a* is called through an internal circuit (not shown) for transmitting an originating signal from the key telephone sets 2*b* and 2*n*. When the operator of the specific key telephone set 2*a* considers it necessary to transmit originating number signals from the receiving alone key telephone sets 2*b* and 2*n*, he sets the receiving alone key telephone sets 2*n* to the condition ready for transmission of the originating signal (this can be accomplished by picking up a handset and then energizing relay H by operating keys $LK_1$ to $LK_3$) and he then actuates non-lock type key $DK_1$ which is located near the specific key telephone set 2*a*. Then, relay D is energized by $DK_1$, relay D and contact K so that irrespective of the opening of key $DK_1$ the relay D is maintained in the energized condition contact $h_4$ of relay H, contact $d_1$, relay D and contact K. Consequently, the polarity of the office line for the receiving alone key telephone sets 2*b* and 2*n* is switched by the contacts $d_2$ and $d_3$ of relay D which comprise the transfer switch 7, thereby rendering non-conductive diodes $SD_5$ of the receiving alone key telephone sets 2*b* and 2*n* to send out the dial impulse generated by the operation of dial impulse contact Di. When lock type key $DK_2$ in parallel with non-lock type key $DK_1$ is closed, the transmission of originating signals from receiving alone key telephone sets 2*b* and 2*n* are possible.

In order to prevent receiving alone key telephone sets 2*b* and 2*n* from transmitting toll dial signals, the toll dial signal transmission control circuit 8 is provided to render them impossible to transmit the signals. More particularly, when toll dial signal transmission discriminating circuit 10 identifies that the originating dial signal detected by the originating dial signal detector 9 is a toll dial signal (usually, the first digit thereof is comprised by a 0), an operating circuit for relay K is formed thereby actuating the same. Accordingly, its contct k is opened to interrupt the holding circuit for relay D thereby restoring the same. As a result, contacts $d_2$ and $d_3$ of relay D reverse the polarity of the line for receiving alone key telephone sets 2*b* and 2*n* whereby diodes $SD_5$ of these telephone sets are rendered conductive. Thereafter, any local dialing is impossible. In the illustrated example, contact $d_4$ of relay D is connected between the source and the toll dial signal transmission discriminating circuit so as to operate the toll dial signal transmission control circuit 8 only when receiving alone key telephone sets 2*b* and 2*n* transmit office line signals. Where contact $d_4$ is omitted, a time delay characteristic is imparted to relay K sufficient to restore relay D when the toll dial signal transmission discriminating circuit 10 identifies the toll dial signal. By closing key $DK_3$ in parallel with the contact K of relay K it is possible to transmit toll dial signals at any desired time irrespective of the operation of relay K.

Although in the foregoing embodiment keys $DK_1$ to $DK_3$ actuated by the operator of the specific key telephone set 2*a* are installed independent therefrom, it will be clear that these keys may be incorporated into the specific key telephone set. Further, although above description was made on the assumption that there is only one local office line, where there are a number of local lines, it is necessary to provide corresponding numbers of the originating number control circuits 6, transfer switches 7 toll line signal transmission control circuits 8 and keys 3 for the purpose of controlling the transmission of the local office signals over respective lines.

As above described, according to this invention there is provided a control system wherein only the transmission of originating signals from respective key telephone sets of a key telephone system are controlled by the operation of a specific key telephone set so that the novel system is suitable for the administration of the telephone fees of the key telephone systems installed in small offices or residences. The novel system is also useful in the key telephone systems installed an apartment houses or a group thereof where telephone fees are paid at different positions.

Returning to FIG. 1 again, we explain hereinunder such case that the originating number control circuit 6 operates when a signal arrives at the terminal L or when the operator of the specific key telephone set 2*a* actuates the key 3 for enabling the receiving alone key telephone set to transmit an originating number signal.

When a signal arrives at the terminal L, transfer switch 7 is closed so that the receiving alone key telephone sets 2*b* and 2*n* as well as the specific telephone set 2*a* are connected to the office line whereby all telephone sets can response to the received signal. When it is desired to transmit originating signals from the receiving alone key telephone sets 2*b* and 2*n*, the operator of the specific key telephone set 2*a* is informed of this fact through an internal line (not shown) whereby the operator of the specific key telephone set 2*a* actuates the key 3 to operate the originating number control circuit 6 thereby connecting the receiving alone key telephone set to the office line. The operation of the originating number control circuit 6 is maintained by the busy condition discrimination circuit 5 which operates while the key telephone set is seizing the office line. When the originating number signal is the toll dial signal and it is desired to prevent the transmission of the toll dial signal, the toll dial signal is detected by the toll dial signal transmission control circuit 8 to release the operation of the originating number control circuit 6 whereby the transfer switch 7 operates to disconnect the receiving alone key telephone set from the office line. The modified embodiment of this invention is shown in FIG. 3.

Figure 3:
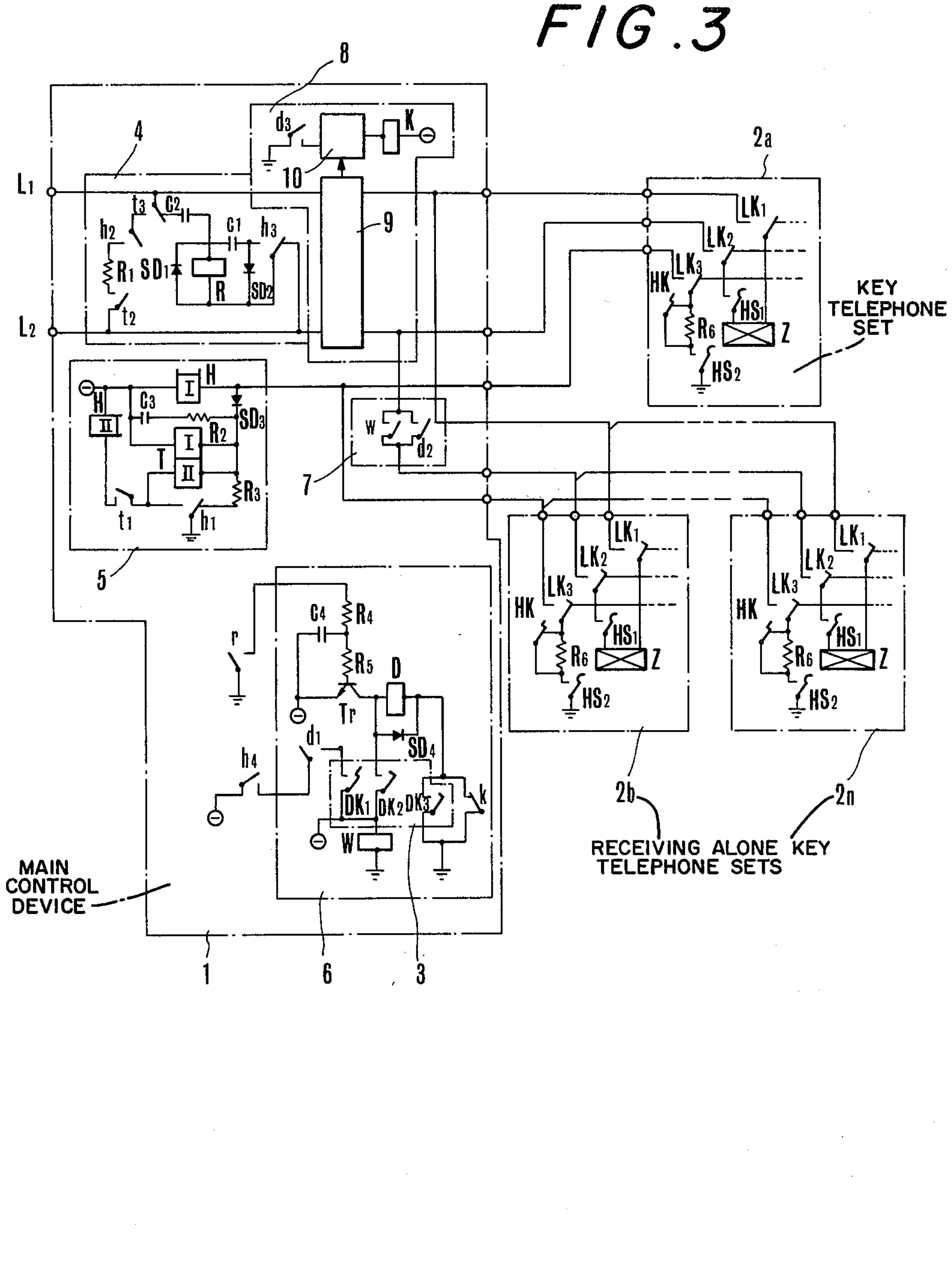
FIG. 3 shows a connection diagram of a modified embodiment of this invention.

The modified embodiment shown in FIG. 3 is generally similar to that shown in FIG. 2. However, in FIG. 3, the transfer switch 7 is constructed to connect and disconnect the receiving alone key telephone sets 2*b* and 2*n* to and from the office line without reversing the polarity. To this end a transistor Tr is connected in series with relay D and a contact r of relay R is connected to the base electrode of transistor *Tr* through a time constant circuit consisting of resistors $R_4$, $R_5$ and a capacitor $C_4$. Further, a relay W is connected in circuit with lock type key $DK_1$ and non-lock type $DK_2$. A contact w of relay W and a contact $d_2$ of relay D are connected between the receiving alone key telephone sets 2*b* and 2*n* and the office line. In this embodiment, the receiving alone key telephone sets 2*b* and 2*n* are not provided with the parallel combination of dial contact Di and diode $SD_5$. The modified embodiment shown in FIG. 3 operates as follows.

The Case of Receiving an Office Line Signal

When an office line signal arrives at terminals $L_1$ and $L_2$, relay R is energed by a circuit extending between terminals $L_1$ and $L_2$ via contact $t_3$, capacitor $C_2$, relay R and contact $h_3$ to close contact r connected to the base electrode of a transistor Tr via resistors $R_4$ and $R_5$ thus turning ON the transistor. Thus, relay D is energized by a circuit extending between a negative source and the ground via the collector-emitter circuit, relay D and contact K of relay K. Since relay R is operated while the office line signal is being received, its contact r is closed intermittently, the transistor T*r* is continuously maintained ON by a time constant circuit consisting of resistors $R_4$ and $R_5$ and capacitor $C_4$ so that the relay D is also energized continuously. When relay D is energized its contact $d_1$ and $d_2$ are closed, the latter establishing a talking line for the receiving alone key telephone sets 2*b* and 2*n* whereby they can respond to the received signal. When the user of either one of the key telephone sets 2*a*, 2*b* and 2*n* responds to the received signal by depressing its keys $LK_1$ to $LK_3$, relay H is operated by a circuit extending between a negative source and the ground through the primary winding of relay H, keys $LK_3$ and HK and hook switch $HS_2$ to close its contact $h_4$ thus establishing a holding circuit for relay D which extends between a negative source and the ground via contact $h_4$, contact $d_1$ , relay D and contact K. Thus, by responding to the received signal, the local talking line for the receiving alone key telephone sets 2*b* and 2*n* can be maintained even when relay D is rendered inoperative by the termination of the received signal. Under talking condition, even when the office line is reserved by the operation of the reserving key for the purpose of transferring the signal from receiving alone key telephone set 2*b* to receiving alone key telephone set 2*n*, relay H is maintained in the operated condition so that relay H can not return to the initial condition. More particularly, if the operator of the receiving alone key telephone set 2*b* depresses a reserving key HK, a short circuit around resistor $R_6$ is interrupted to pass current through the secondary winding of relay T thereby cancelling the magnetic flux produced by the primary winding. This restores relay T but relay H is maintained in the operated condition by a current flowing through a holding circuit extending between the secondary winding of relay H and the ground via contact $t_1$ and contact $h_1$ irrespective of the release of key $LK_3$. Under these conditions, the local line is preserved by a circuit extending between terminals $L_1$ and $L_2$ through contacts $t_3$ and $h_2$, resistor $R_1$ and contact $t_2$.

Upon termination of the speech, as keys $LK_1$ to $LK_3$ and hook switches $HS_1$ and $HS_2$ are opened, relay H is released to interrupt the holding circuit of relay D thus restoring the same. Accordingly, its contacts $d_1$ and $d_2$ are opened to interrupt the receiving alone key telephone sets 2*b* and 2*n* from the local line whereby these telephone sets can not transmit local line signals.

The Case of Transmitting an Office Line Signal

When it is desired to transmit office line signals from the receiving alone key telephone sets 2*b* and 2*n*, the operator of the specific key telephone set 2*a* is called through the internal line (not shown) for the connection to the office line. If the operator of the specific key telephone set 2*a* notices that it is necessary to transmit the office line signals from receiving alone key telephone sets 2*b* and 2*n*, he prepares these telephone sets for the transmission of the office line signal (this can be accomplished by picking up the handset to close keys $LK_1$ through $LK_3$ thereby operating relay H) and then actuates the non-lock type key $DK_1$ located near the specific key telephone set 2*a*. Consequently, relay D will be energized by a circuit extending between a negative source and the ground through key $DK_1$, relay D, and contact K, and relay D is maintained in the operated condition irrespective of the release of key $DK_1$ by a holding circuit including contact $h_4$ of relay H. Accordingly, the receiving alone key telephone sets 2*b* and 2*n* are connected to the local line through contact $d_2$ so that they can transmit local line signals.

Where the receiving alone key telephone sets 2*b* and 2*n* are not prevented from transmitting local signals, the lock type key $DK_2$ connected in paralled with the non-lock type key $DK_1$ is maintained in the closed position.

The purpose of the toll dial signal transmission control circuit 8 of the embodiment shown in FIG. 3 is similar to that of the toll dial signal transmission control circuit shown in FIG. 2. More particularly, when the toll dial signal transmission discriminating circuit 10 identifies that the line dial signal detected by the office line dial signal detector 9 is a toll line signal (usually, the first digit thereof is comprised by a 0), an operating circuit for relay K is formed thereby actuating the same. Accordingly, its contact k is opened to interrupt the holding circuit for relay D thereby restoring the same. As a result, its contact $d_2$ is opened to disconnect the receiving alone button telephone sets 2*b* and 2*n* from the local line. In this embodiment, the contact $d_3$ of relay D is connected between the toll dial signal transmission discriminating circuit 10 and a source for operating the toll dial signal transmission control circuit 8 only when the receiving alone key telephone sets 2*b* and 2*n* transmit the local signal but where it is desired to cause the toll dial signal transmission discriminating circuit 10 to identify the transmission of the toll dial signal without providing contact $d_3$, a time delay is imparted to relay K necessary to restore relay D. Where it is desired to make it possible to transmit a toll dial signal also at any time, a key $DK_3$ is connected in parallel with contact k of relay K. By closing key $DK_3$, it becomes possible to transmit toll signals irrespective of the operation of relay K. When supply of operating power is interrupted, relay W, which is provided for the purpose of supervising the fault of the source, is deenergized to close its contact W so that the connection between the local circuit and the receiving alone key telephone sets 2*b* and 2*n* can be maintained.

Again, it is possible to incorporate keys $DK_1$ to $DK_3$ in the specific key telephone set 2*a* and to provide a plurality of local lines.

What is claimed is:

1. In a key telephone system connected to at least one office line wherein a talking line and a control line are associated with a main control device, and a specific key telephone set and at least one receiving alone key telephone set are connected to said talking and control lines, an originating number control system for controlling access to an office line by said sets via said talking line comprising an originating number control circuit operable by an operator of said specific key telephone set, a busy discriminating circuit which is operated while any one of said key telephone sets is seizing an office line, means for maintaining said originating number control circuit in operated condition if operated while an office line is seized by said busy discriminating circuit, polarity transfer means responsive to the operation of said originating number control circuit for reversing the polarity of the talking line for said receiving alone key telephone set, and a diode connected to short circuit the dial signal transmission circuit of said receiving alone key telephone set when said originating number control circuit is not operated, whereby said receiving alone key telephone set can transmit an originating number signal only when said originating number control circuit is operated.

2. The control system according to claim 1 wherein a toll dial signal transmission control circuit is provided for the local talking line including means responsive to the initial digit of a toll dial signal for releasing the holding condition of said originating number control circuit when said receiving alone key telephone set transmits a toll dial signal thereby terminating the enablement of said receiving alone key telephone set to transmit dial signals.

3. The control system according to claim 1 wherein said means responsive to the operation of said specific key telephone set comprises a key located close to said specific key telephone set and operated by the operator of said specific key telephone set.

4. The control system according to claim 1 wherein said means responsive to the operation of said specific key telephone set comprises a key incorporated therein such that said key is closed when the handset of said specific key telephone set is picked-up.

5. In a push key telephone system connected to at least one office line wherein a talking line and a control line are associated with a main control device, and a specific key telephone set and at least one receiving alone key telephone set are connected to said talking and control lines, an originating number control system for controlling access to an office line by said sets via said talking line comprising a busy discriminating circuit, an originating number control circuit responsive to a signal received by said office line and maintained in the operated condition by said busy discriminating circuit while any one of said key telephone sets is seizing an office line, switch means controlled by said originating number control circuit for connecting said receiving alone key telephone set to an office line which receives a signal, means actuable by the operator of said specific key telephone set for operating said originating number control circuit, and means responsive to the operation of said originating number control circuit for enabling said receiving alone key telephone set to transmit an originating number signal.

6. The control system according to claim 5 wherein a toll line signal transmission control circuit is provided for the local talking line including means responsive to the receiving alone key telephone set transmitting a toll line signal for deenergizing said originating number control circuit thereby preventing said receiving alone key telephone set from transmitting the toll dial signal.

7. The control system according to claim 5 wherein said means responsive to the operation of said specific key telephone set comprises a key located close to said specific key telephone set and operated by the operator of said specific key telephone set.

8. The control system according to claim 5 wherein said means responsive to the operation of said specific key telephone set comprises a key incorporated therein such that said key is closed when the handset of said specific key telephone set is picked-up.

9. The control system according to claim 5 wherein said switch means comprises a relay energized in response to said office line signal.

* * * * *